United States Patent [19]

Haas et al.

[11] Patent Number: 4,681,903

[45] Date of Patent: Jul. 21, 1987

[54] POLYESTER POLYOLS, A PROCESS FOR THEIR PRODUCTION AND THEIR USE IN THE ISOCYANATE POLYADDITION PROCESS

[75] Inventors: Peter Haas, Haan; Hans-Ulrich Weber, Monheim; Claus-Dieter Sommerfeld, Much; Manfred Giersig, Cologne; Rolf Wiedermann, Odenthal, all of Fed. Rep. of Germany

[73] Assignee: Bayer Aktiengesellschaft, Leverkusen Bayerwerk, Fed. Rep. of Germany

[21] Appl. No.: 892,978

[22] Filed: Aug. 4, 1986

[30] Foreign Application Priority Data

Aug. 24, 1985 [DE] Fed. Rep. of Germany ....... 3530360
Sep. 10, 1985 [DE] Fed. Rep. of Germany ....... 3532140
Mar. 20, 1986 [DE] Fed. Rep. of Germany ....... 3609361

[51] Int. Cl.$^4$ .................................................. C08G 18/14
[52] U.S. Cl. ........................................ 521/167; 252/182; 521/164; 521/902; 528/81; 528/85; 560/196
[58] Field of Search ......................... 521/167, 164, 902; 528/81, 85; 560/196; 252/182

[56] References Cited

U.S. PATENT DOCUMENTS 2,831,813 4/1958 Matuszak et al. .................. 560/196
3,927,073 12/1975 Sundby .............................. 560/196

Primary Examiner—Maurice J. Welsh
Attorney, Agent, or Firm—Gene Harsh; Joseph C. Gil; Lyndanne M. Whalen

[57] ABSTRACT

Polyester polyols corresponding to the formula

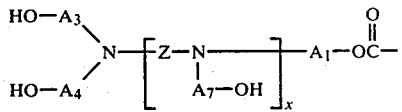

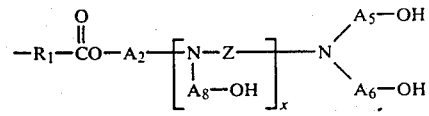

in which $R_1$, $Z$, $x$, $A_1$, $A_2$, $A_3$, $A_4$, $A_5$, $A_6$, $A_7$ and $A_8$ each represent specified groups or values are made by reacting (a) a dicarboxylic acid or derivative thereof or anhydride thereof with (b) a tris-alkanolamine and/or tetrakis-alkanol diamine. These polyester polyols are particularly useful in the production of polyurethane and polyisocyanurate foams.

19 Claims, No Drawings

POLYESTER POLYOLS, A PROCESS FOR THEIR PRODUCTION AND THEIR USE IN THE ISOCYANATE POLYADDITION PROCESS

BACKGROUND OF THE INVENTION

This invention relates to new, nitrogen-containing, low-viscosity polyester polyols, a process for their production and their use in the production of polyurethane (urea)s and polyisocyanurates.

Rigid foams produced by the isocyanate polyaddition process have now become a significant class of materials in the field of insulation. In general, such foams are rigid polyurethane (urea) foams and, in particular, rigid polyisocyanurate foams. The latter foams show high flame resistance on their own without the assistance of additives. Rigid foams are generally produced from polyisocyanates and polyether polyols or from a mixture of polyether and polyester polyols. Combinations of various polyol components with additives are generally used in cases where the rigid foams have to satisfy certain flameproofing standards.

The advantage of polyether polyols is that predetermined functionalities may be adjusted as required through the starter species (polyols or polyamines). Polyols specific to rigid foams, for example polyols based on sorbitol or sucrose starters having a functionality of greater than 4 and also a low viscosity, may be produced from polyethers and have OH numbers in the range of from 200 to 600.

In order to reach certain flameproofing standards, polyester polyols, generally of high viscosity, are added to the starting polyethers. However, on account of their lower functionality, the polyester polyols may only be added in limited quantities because otherwise the resulting foam would be too flexible. Other components used in the production of flame resistant polyurethane foams are phosphoric or phosphonic acid esters or other phosphorus derivatives which, for the most part, cannot be incorporated, i.e. are able to migrate and likewise to soften the foam. Of greater advantage in regard to migration are the incorporable phosphonic acid esters, such as Baytherm ® 4090 N (a product of Bayer AG, Leverkusen). Unfortunately, phosphonic acid esters also have a softening effect due to their bifunctionality and may only be added in limited quantities. Halogen-based flameproofing agents often have a similar effect and in addition, give off corrosive gases, particularly during the burning of foams.

It would therefore be particularly advantageous to have rigid foam polyols which satisfy the following criteria:
(a) increased functionality by comparison with standard polyester polyols in order to be able to dispense with the copolyethers of relatively high functionality hitherto necessary;
(b) low viscosity in polyester polyols of relatively high functionality;
(c) inherent flameproofing properties which eliminate or reduce the need to use non-incorporable, flexibilizing flameproofing agents which give off corrosive gases in the event of fire and
(d) production of rigid foams with high thermal stability and high mechanical strength.

SUMMARY OF THE INVENTION

The polyols of the present invention satisfy each of the above-described criteria.

These polyols correspond to the general formula

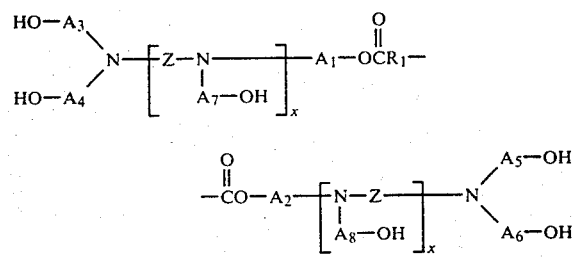

in which R, Z, $A_1$, $A_2$, $A_3$, $A_4$, $A_5$, $A_6$, $A_7$, $A_8$ and x each represent specified groups or values. These polyols are obtained by reacting (a) a dicarboxylic acid, derivative thereof or anhydride thereof with (b) a tris-alkanolamine and/or tetrakis-alkanol diamine in a molar ratio of (a) to (b) of from 1:1.2 to 1:2. These polyols may be reacted with an isocyanate to form polyurethane (urea)s and polyisocyanurates.

DETAILED DESCRIPTION OF THE INVENTION

The present invention relates to new, nitrogen-containing, relatively low-viscosity polyester polyols which are particularly suitable for use as rigid foam polyols in the isocyanate polyaddition process. They have the following general formula:

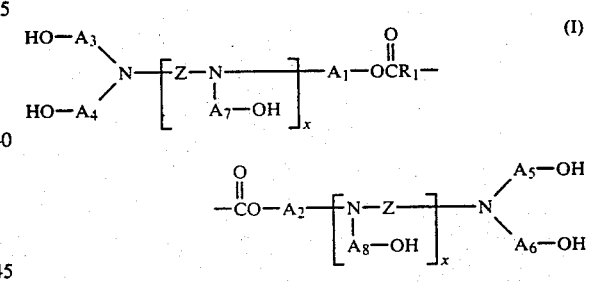

in which
$R_1$ represents a bond or a difunctional radical, such as a straight-chain or branched $C_1$–$C_{12}$ alkylene radical, which may optionally be substituted by heteroatoms such as —O—, —S—, —N($C_1$–$C_4$)—alkyl (preferably a straight-chain or branched $C_2$–$C_4$ radical), an unsaturated $C_2$–$C_{12}$ alkene radical (preferably the —CH=CH— radical), or (less preferably) a $C_6$–$C_{10}$-arylene radical such as a phthalic acid, isophthalic acid or even a terephthalic acid residue,
Z represents a difunctional, straight-chain or branched $C_2$–$C_6$ alkylene radical, preferably the

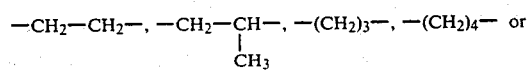

$(CH_2)_6$— radical and
x independently of one another has the value 0 or 1 (preferably the value 0) and
$A_1$ to $A_8$ (which may be the same or different) each represents a difunctional, straight-chain or branched alkylene radical containing from 2 to 6 carbon atoms, preferably —CH₂—CH₂—, —(CH₂)₃—,

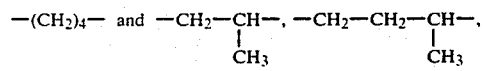

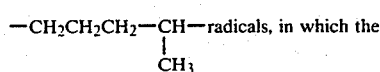

secondary, —CH— group is adjacent a hydroxyl

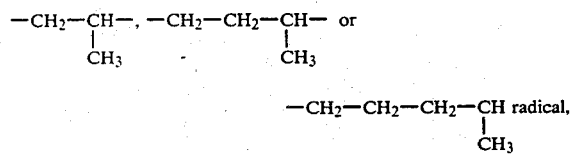

group, more especially —CH₂—CH₂— or

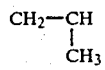

radicals at least 20%, preferably from 25 to 75% and more preferably from 50 to 75% of the radicals A₃ to A₆ in the polyester polyol (I) or mixtures or oligomer mixtures thereof preferably represent a radical containing a secondary —CH— group (corresponding to a secondary hydroxyalkyl radical), more preferably a

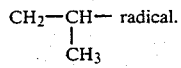

and most preferably a

CH₂—CH— radical.
        |
        CH₃

Particular preference is attributed to polyester polyols which predominantly (more than 75% by weight) correspond to formulae Ia, Ih below

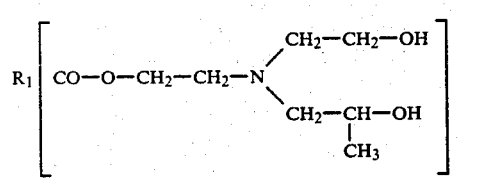

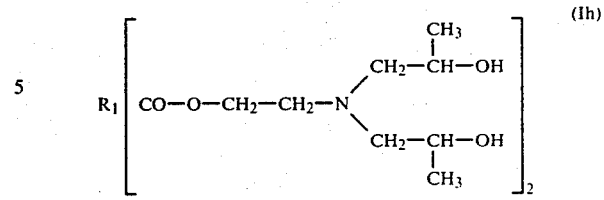

or mixed condensates of Ia and Ih

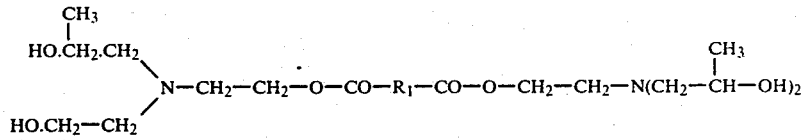

and to the following formulae

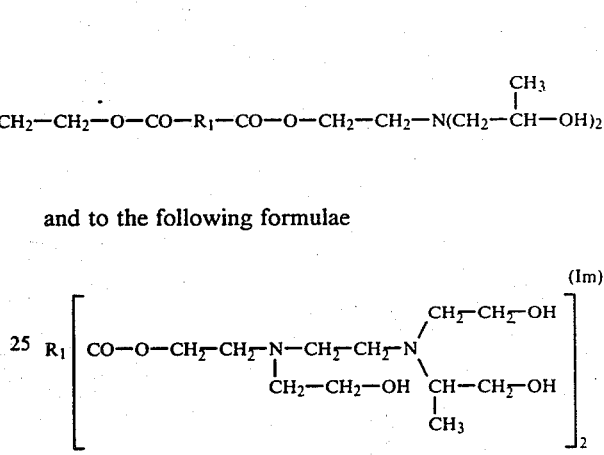

and/or

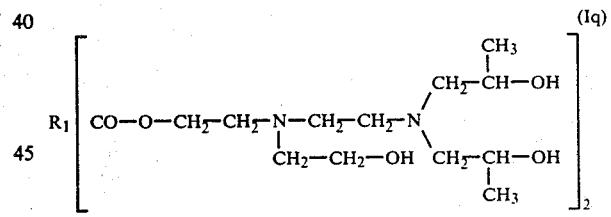

and any others which are synthesized from the dicarboxylic acids (derivatives) and the diols IIa, h, or III m, p, q described herein. Polyester polyols which predominantly correspond to formulae (Ia) and/or (Ih) and/or mixed condensates of Ia and Ih are particularly preferred.

The nitrogen-containing polyester polyols of the present invention preferably have an OH number of from 200 to 700 and more preferably from 250 to 650. Their viscosity may increase, particularly in the case of the oligopolyester polyols, to around 90,000 mPa.s/25° C., preferably to below 20,000 mPa.s/25° C. and, more preferably, less than 10,000 mPa.s/25° C. Viscosities below 3500 mPa.s, for example in the range of from 800 to 3500 mPa.s are especially desirable.

The present invention also relates to the process for producing the nitrogen-containing polyester polyols of the present invention and their oligomers corresponding to general formula (I), by reaction of dicarboxylic acid (derivative)s ROCOR₁COOR (R=H, alkyl, phenyl) or anhydrides thereof with tris-alkanaolamines (II) and/or tetrakis-alkanol diamines (III) with elimination of water or alcohols in a molar ratio of the dicarboxylic acids, their anhydrides or esters to trisalkanolamines and/or tetrakis-alkanol diamines of from 1:2 to 1:1.2. If the ratio is 1:2 (but at least 1.0:1.2), particularly from 1:1.5 to 1:2, higher ester homologs of the compounds corresponding to formula (I) (oligomers) may also be obtained, generally in the form of mixtures. The oligomers obtained with a ratio distinctly lower than 1:2 (for example 1:1.9) show increasing viscosity with decreasing proportion of alkanolamine derivatives (II) or (III). Relatively high viscosities are generally less preferred so that the formation of oligomeric esters having viscosities of >20,000 mPa.s is less preferred. Accordingly, preference is attributed to the low molecular weight derivatives corresponding to formula (I) or mixtures thereof with oligomeric esters in which the reaction ratio is at least 1:1.5. It is also possible to use molar excesses of II or III of more than 1:2, although these quantities are not incorporated into the product but instead are preferably removed before completion of the esterification.

Among the polyester polyols (I), the derivatives of tris-alkanolamines are preferred to the derivatives of the tetrakis-alkanol diamines because the former give lower viscosities.

The present invention also relates to the use of the described low-viscosity, nitrogen-containing polyester polyols obtainable by the claimed process corresponding to general formula (I) and having an OH functionality of from about 4 to 6 and, less preferably, their oligomers of higher viscosity and higher functionality in the isocyanate polyaddition process for the production of polyurethanes, preferably rigid foams based on polyurethane (ureas)s and, more preferably polyisocyanurates, particularly flameproof rigid foams satisfying the requirements of fire class B2 for building materials.

Starting materials for the production of the polyester polyols (I) include: oxalic acid (less preferred), malonic acid, succinic acid, glutaric acid, technical glutaric acid, adipic acid, technical adipic acid (essentially succinic/glutaric and adipic acid mixtures), methyladipic acid, sebacic acid, the technical dicarboxylic acid mixture known as isosebacic acid, suberic acid, azelaic acid, diundecanoic acid, didodecanoic acid, diglycolic acid, thiodiglycolic acid, and also unsaturated aliphatic dicarboxylic acids, such as maleic acid, or even phthalic acid or isophthalic acid or terephthalic acid. The aromatic dicarboxylic acids, particularly terephthalic acid, are preferably used in only small quantities so that liquid polyester polyol derivatives are obtained. Instead of using the free dicarboxylic acid, it is also possible to use (lower) alkylesters thereof (preferably $C_1$-$C_6$ alkyl groups) and also cyclic or linear anhydrides thereof.

Among the polyalkanolamines and polyalkanol polyamines, preference is attributed to the tris-alkanolamines (II) and the tetrakis-alkanol diamine

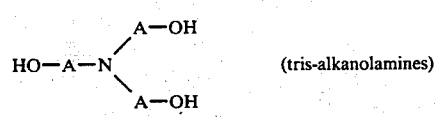
(tris-alkanolamines) (II)

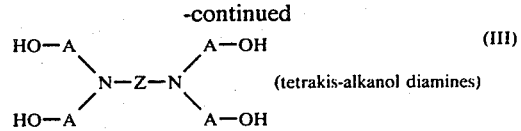
(tetrakis-alkanol diamines) (III)

in which one or two of the radicals A are secondary radicals containing —CH— groups, preferably

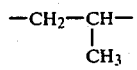

—CH$_2$—CH$_2$—CH— or —CH$_2$—CH$_2$—CH$_2$—CH—
          |                              |
          CH$_3$                          CH$_3$ radicals,
more especially

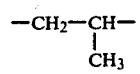

radicals (corresponding to secondary alcohol radicals in the alkanolamines) and the other radicals A are —(CH$_2$)$_{2-6}$— radicals, more especially ethylene radicals —CH$_2$—CH$_2$— (corresponding to primary alcohol radicals in the alkanolamines).

The following are examples of trisalkanolamines with one radical containing a secondary OH group;

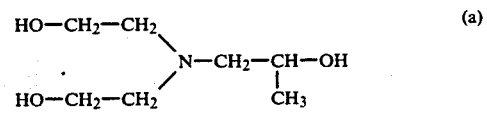
(a)

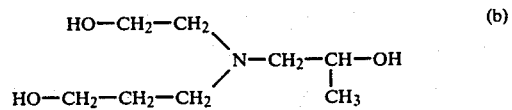
(b)

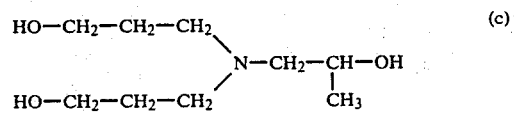
(c)

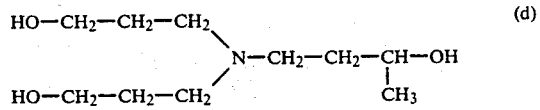
(d)

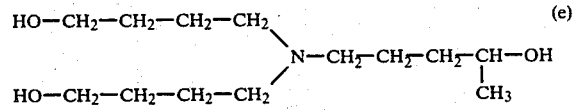
(e)

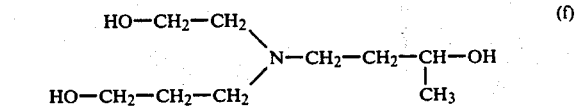
(f)

and

-continued

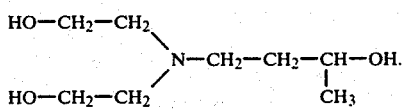
(g)

Examples of tris-alkanolamines containing two radicals with secondary OH groups are:

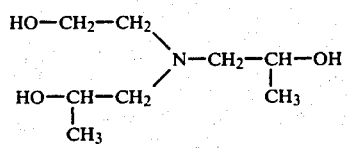
(h)

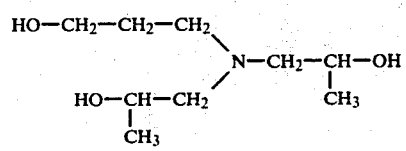
(i)

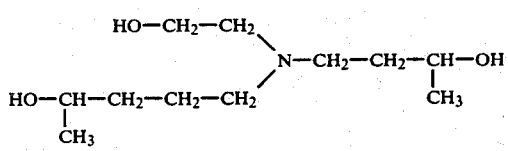
(k)

and

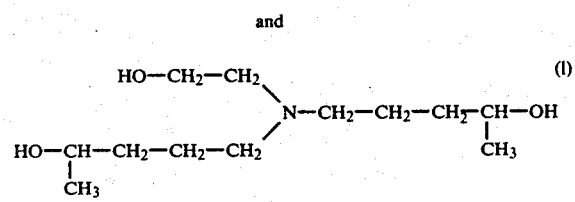
(l)

Examples of tetrakis-alkanol diamines having one radical containing a secondary OH—group are:

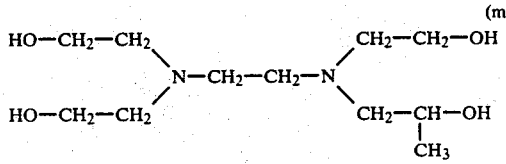
(m)

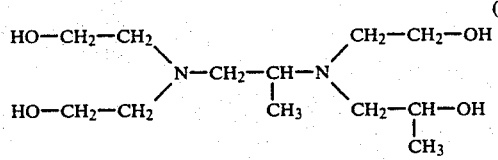
(n)

and

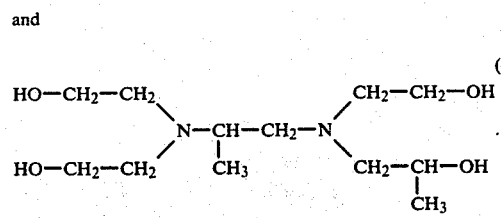
(o)

Examples of tetralkis-alkanol diamines having two radicals containing a secondary OH—group are:

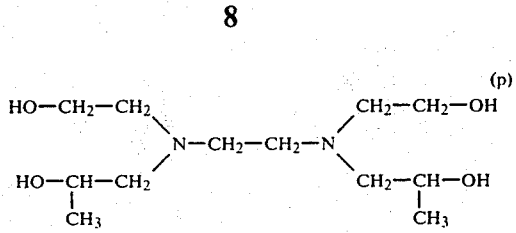
(p)

and

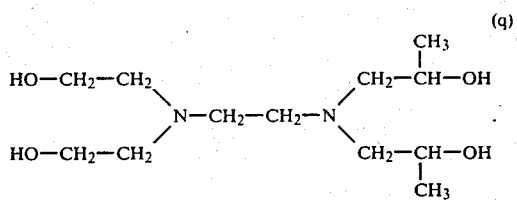
(q)

Particular preference is attributed to the compounds represented by formulae (a), (h), (m), (p) and (q) and to mixtures thereof, more especially to the compounds (a) and (h), and to mixtures of (a) and (h).

The tris-alkanolamines are preferred to the tetrakis-alkanol diamines because the latter have a tendency to form relatively high viscosities in the polyester polyols (I) and accordingly, despite their higher functionalities, may only be used where these relatively high viscosities appear tolerable.

Instead of using the above-mentioned preferred tris-alkanolamines and/or tetrakis-alkanol diamines containing one or two secondary hydroxyl groups, it is also possible to use mixtures of tris-alkanolamines containing three primary hydroxyalkyl groups, for example $$(HO-CH_2-CH_2)_3-N \quad (r)$$

and three secondary hydroxyalkyl groups, for example $$(HO-CH-CH_2)_3-N \atop CH_3 \quad (s)$$

in corresponding molar ratios, preferably from 2:1 to 1:2, more especially 1:1. This embodiment is however a less preferred one.

The amine and diamine compounds mentioned above (or even other polyalkanolamines or polyalkanol polyamines) may also be co-condensed in the form of their alkanolamine mixtures with the dicarboxylic acids or their derivatives. The co-condensates are less preferred to polyester polyols made with only one alkanolamine derivative, especially those made with the alkanolamines represented by formulae (a), (h) and (m) or (p) and (q).

Tetrakis-alkanol diamines containing four primary hydroxyalkyl groups, for example $$(HO-CH_2-CH_2)_2-N-Z-N-(CH_2-CH_2-OH)_2 \text{ or} \quad (t)$$

$$(HO-CH_2-CH_2)_2-N-CH_2CH_2-N-(CH_2-CH_2-OH)_2 \quad (u)$$

may not be used for the production of polyester polyols (I) and halogen alkane-blown rigid foams based thereon because they do not sufficiently dissolve the blowing agent, for example Frigen ®. Corresponding foam formulations collapse or do not give useable foams. On the other hand, tetrakis-alkanol diamines containing four secondary hydroxyalkyl groups, for example

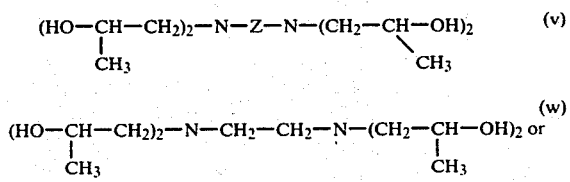

show excellent compatibility with blowing agents (for example with Frigen ® but give rigid foam in which the thermal stability and, in particular, flame resistance values are too greatly reduced. Similarly, polyalkanol diamines containing one primary and three secondary hydroxy groups, for example the compound

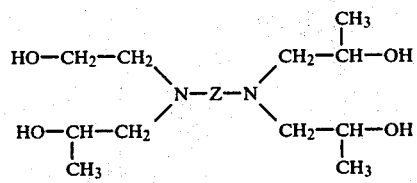

where Z is

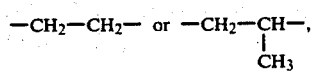

give foams with less than optimal thermal stability values and flameproof properties.

Although mixtures of tetrakis-alkanol diamines with compounds containing primary or secondary hydroxyalkyl groups may also be used such mixtures are less preferred.

Where mixtures of alkanolamine derivatives containing primary or secondary hydroxyalkyl groups are used, their composition should preferably be such that, of the radicals $A_3$ to $A_8$ in formula (I), they contain on average the following:

where both x's=0: from 0.8 to 3.2 (preferably from 1.5 to 3) secondary hydroxyalkyl radicals A and from 3.2 to 9.8 (preferably from 2.5 to 1) primary hydroxyalkyl groups:

for x=0 and x=1: from 1.0 to 4.0 (preferably from 1.75 to 3.5) secondary hydroxyalkyl radicals A and from 4.0 to 1.0 (preferably from 3.25 to 1.5) primary hydroxy-alkyl radicals and where both x's=1: from 1.2 to 4.8 (preferably from 2 to 4) secondary hydroxyalkyl radicals A and from 4.8 to 1.2 (preferably from 4 to 2) primary hydroxyalkyl radicals.

The radicals $A_1$ and $A_2$ in formula (I) are formed predominantly (more than 75%) from unbranched (primary) hydroxyalkyl groups because the esterification of the primary hydroxyalkyl groups takes place preferentially to the esterification of secondary hydroxy-alkyl groups. Accordingly, the possible but small proportion of polyester polyol in which an esterification reaction takes place at the secondary hydroxyl group [for example in esterification reactions of dicarboxylic acids and (a)] is not taken into account in general formula (I).

Preferred processes are those in which the polyesters (I) according to the invention are synthesized from the dicarboxylic acid (derivative)s with tris-alkanolamines containing one secondary and two primary hydroxyalkyl groups or, in the case of the tetrakis-alkanol diamines, from one secondary and three primary or two secondary and two primary hydroxyalkyl groups. Esters thus synthesized are particularly suitable polyols for the production of rigid foams by the isocyanate polyaddition process because they show optimal properties both in regard to compatibility with blowing agents and also in regard to thermal stability under load and functionality structure. Tetra- and hexa-primary polyesters show inadequate compatibility with blowing agents. Although they exhibit high compatibility with blowing agents, polyester polyols (I) containing more than three and, in particular, four secondary hydroxyalkyl groups (both indices x=0) and polyester polyols (I) containing more than four secondary hydroxy-alkyl groups (in the case of tetrols, i.e. where both indices x=1) show diminishing flameproof properties and, in particular, diminishing thermal stability under load.

Accordingly, the most preferred tris alkanolamine is

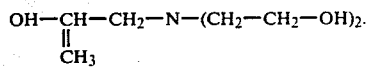

A polyester polyol corresponding to formula (I), in which $A_1$ and $A_2$ represent the —$CH_2$—$CH_2$— radical, $A_3$ and $A_5$ the —$CH_2$—$CH_2$— radical and $A_4$ and $A_6$ the sec.-propyl radical

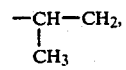

is correspondingly preferred. (Secondary hydroxyalkyl groups may also be included to a minor extent in the ester reaction, so to some extent the radicals $A_1$ and $A_2$ may also represent the sec.-propyl radical.)

The process for producing the new polyester polyols corresponds in principle to standard esterification or transesterification reactions for the preparation of ester polyols. For example, dicarboxylic acid dialkyl-esters may be heated with corresponding quantities of tris-alkanolamines to relatively high temperatures of from about 70° to 140° C., the alkanol formed by the standard transesterification reaction being continuously distilled off. The reaction is preferably carried out in an inert gas atmosphere, for example nitrogen, and optionally in the presence of transesterification catalysts. By subsequently applying a vacuum, for example at 100° to 150° C., residues of ester groups may be reacted. The reaction time ranges from 30 minutes to several hours, depending on the reaction temperature. The progress of the esterification or transesterification reaction may be followed by measurement of the acid number and the OH number. Undesirable further condensation to oligo-esters with an increase in viscosity beyond the optimal range may be detected by monitoring the viscosity trend.

Where both primary and secondary hydroxyalkyl radicals are present during the esterification or transesterification reaction (as is preferably the case), the primary hydroxy group preferably reacts although the secondary hydroxyalkyl group also reacts but to a lesser extent.

Where free dicarboxylic acids are used, the esterification temperatures are generally higher, for example in the range of from 130° to 200° C. and preferably in the range of from about 140° to 180° C. The water of condensation distills off over a period of several hours (a process which may be completed by the subsequent application of vacuum). This reaction may also be monitored as described above. The quantitative ratios between dicarboxylic acid (derivative)s and alkanolamine derivatives have already been indicated. It is surprising that the polyester polyols of the present invention can be reacted so smoothly using the tri- or tetra-functional alkanolamines and that no cross-linking occurs despite the high functionality of the products. Even with low reaction ratios of dicarboxylic acids to tris-alkanolamines of from 1.2 to 2, oligomer formation rather than cross-linking occurs. The reaction to the high functionality polyesters preferably takes place with a ratio of a carboxyl or ester group to each mole of tris- or tetrakis-alkanolamine of from 1:0.55 to 1.0 and preferably of from 1:0.6 to 1.0. Small excesses of tris- or tetra-alkanolamines, for example up to 1.5 moles per carboxyl group, may be used and may be distilled off again (preferably in vacuo).

The trisalkanolamines may be produced, for example, by reaction of ammonia with ethylene oxide and propylene oxide. The preferred trisalkanolamine (a) is advantageously synthesized from commercially available diethanolamine and propylene oxide, although it may also be obtained from isopropanolamine and 2 moles ethylene oxide.

The technical value of the polyester polyols (I) of the invention lies in their high functionality, their comparatively low viscosity, which provides for easy processing in cold-metering foaming reactors, in their autocatalytic behavior (the tertiary amino groups in the polyols have a catalytic effect on the NCO reactions) and in their very pronounced flame resistance after reaction in the isocyanate polyaddition process to form rigid foams.

Flameproofing agents generally have to be used, albeit in reduced quantities, in water-blow and Frigen ® blown polyurethane (urea) rigid foams to obtain adequate flame resistance (for example for classification in fire class B2 as defined in DIN 4102 for building materials). However, it is not necessary to use flameproofing additives in rigid isocyanurate foams blown without water to satisfy the requirements of fire class B2 of DIN 4102. The combination of isocyanurate foaming with the use of the polyester polyols (I) of the invention gives excellent rigid foams which comply with the fire resistance criterion and which also show excellent hardening behavior. Polyisocyanurate foams (PIR-foams) have hitherto been produced from polyether polyols or from a mixture of polyether and polyester polyols and excess polyisocyanate with the isocyanate excess being catalytically trimerized to the isocyanurate group.

Some polyol components are only used in these PIR-foams where compliance with certain flameproofing standards is required. However, the usual polyether polyols or polyester polyols show typical disadvantages. In the case of the polyester polyols for example, viscosity is too high and functionality too low. The requirements of fire classes B1 and B2 according to DIN 4102 are generally only satisfied by mixtures of polyester polyols in which flameproofing agents selected from phosphoric acid esters or from halogen-containing compounds are also incorporated. The adverse effects of these raw materials or combinations both in terms of excessive viscosity, inadequate functionality and behavior during the burnings of flame resistant compositions are avoided by the use of the polyester polyols (I) of the present invention.

The test criterion generally used to evaluate a foam's flame resistance, is the small burner test according to DIN 4102. In this test, the test specimens (measuring $90 \times 190 \times 10$ mm) are vertically clamped in a fire box with a burner arranged at an angle and subjected to edge flame application and to surface flame application for 15 seconds in either case. The tips of the flames should not exceed the 150 mm mark over a total period of 20 seconds for classification in fire class B2.

The polyester polyols of the present invention fall well short of that mark for a B2 classification. Rigid polyisocyanurate foams made with the polyester polyols of the present invention have a B2 classification even without flameproofing additives, particularly those based on phosphorus and/or halogen.

Another criterion for the quality of the foams is the level of hardness obtainable which is a function of the crosslinking density. Hardness is expressed as the depth of penetration of a certain test instrument into the foam and is measured by the penetration/time curve recorded at certain intervals beginning from the cream time. Polyols according to the invention show a good level of hardness.

In addition to the polyols according to the invention, starting materials useful for the production of isocyanate addition products such as polyurethanes, preferably rigid polyurethane (urea) or polyisocyanurate foams include aliphatic, cycloaliphatic, araliphatic, heterocyclic and, in particular, aromatic polyisocyanates (including diisocyanates) of the type described, for example, by W. Siefken in Justus Liebigs Annalen der Chemie, 562, pages 75 to 136, for example those corresponding to the formula $Q(NCO)_n$, where $n=2$ to 4, preferably 2, and Q is an aliphatic hydrocarbon radical containing from 2 to 18 and preferably from 6 to 12 carbon atoms, a cycloaliphatic hydrocarbon radical containing from 4 to 20 and preferably from 5 to 11 carbon atoms, an aromatic hydrocarbon radical containing from 6 to 20 and preferably from 6 to 13 carbon atoms or an araliphatic hydrocarbon radical containing from 8 to 15 and preferably from 8 to 13 carbon atoms, for example polyisocyanates of the type described in DE-A 2,832,253, pages 10 to 11. It is particularly preferred to use the commercially readily obtainable polyisocyanates, such as 2,4- and/or 2,6-tolylene diisocyanate, and mixtures of these isomers ("TDI"); diphenylmethane diisocyanates (4,4'- and/or 2,4'- and/or 2,2'-isomers); polyphenyl-polymethylene polyisocyanates of the type obtained by phosgenating aniline-formaldehyde condensates ("crude MDI"); and "modified polyisocyanates" containing, for example, carbodiimide groups, urethane groups, allophanate groups, isocyanurate groups, urea groups and/or biuret groups, more particularly modified polyisocyanates of the type derived from 4,4'- and-/or 2,4'- and/or 2,2'-diphenylmethane diisocyanate.

Where only difunctional compounds of relatively high molecular weight and, optionally, other only difunctional low molecular weight chain extending agents are used, it is preferred to use modified polyisocyanates having a functionality of more than 2.0 or triisocyanates and/or higher polyisocyanates.

Compounds containing at least 2 isocyanate-reactive hydrogen atoms and having a molecular weight of from 18 to 399 may also be used as starting materials for the production of polyurethanes. Such compounds may contain hydroxyl groups and/or amino groups and/or thiol groups and/or carboxyl groups and/or hydrazide groups, preferably hydroxyl groups and/or amino groups and serve as chain-extending agents or as cross-linking agents. These compounds generally contain from 2 to 8 and preferably from 2 to 4 isocyanate-reactive hydrogen atoms. Examples of these compounds can be found in DE-A 2,832,253, pages 9 to 20. Water, hydrazine, ethyleneglycol, 1,4-butane diol, neopentyl glycol, trimethylol propane, formitol mixtures and adipic acid dihydrazide are specific examples of such compounds.

Compounds containing at least two isocyanate-reactive hydrogen atoms and having a molecular weight of generally from 400 to 10,000 may be used in small quantities (up to 45 wt. % based on the polyester polyols according to the invention) as co-polyol component in the isocyanate addition reaction. In addition to compounds containing amino groups, thio groups or carboxyl groups, preferred compounds of this type are compounds containing hydroxyl groups, more especially compounds containing from 2 to 8 hydroxyl groups, particularly those having molecular weight in the range from 600 to 6000 (preferably from 1500 to 4000), preferably polyesters, polyethers, polythioethers, polyacetals, polycarbonates and polyesteramides containing from 2 to 4 hydroxyl groups of the type commonly used for the production of homogeneous and cellular polyurethanes. Such compounds are described, for example, in DE-A 2,832,253, pages 11 to 18. It is particularly preferred to use polyethers which have been obtained by addition of one or more alkylene oxides (ethylene oxide and particularly propylene oxide) onto difunctional or polyfunctional starters (propylene glycol, glycerol, sorbitol, formose, triethanolamine, trimethylol propane) and also polyethers containing polyadducts of diisocyanates and hydrazine and/or diamines and/or glycols or polymers and/or graft polymers, preferably of styrene and acrylonitrile, either in dispersion or in solution. The preferred polyethers have an average functionality of greater than 2.0.

Auxiliaries and additives, such as readily volatile inorganic or preferably organic compounds as blowing agents; known catalysts, such as tertiary amines, tin(II) and tin(IV) compounds; surface-active additives, such as emulsifiers and foam stabilizers; reaction retarders, for example acid-reacting compounds, such as hydrochloric acid or organic acid halides; known cell regulators, such as paraffins, fatty alcohols or dimethyl polysiloxanes or functional silicone derivatives; pigments; dyes; stabilizers against the effects of ageing, light and weather; plasticizers; fungistatic and bacteriostatic agents and also fillers may optionally be used in the isocyanate addition reaction. These optional auxiliaries and additives are described in detail, for example, in DE-A 2,732,292, pages 21 to 24. Other examples of the auxiliaries and additives can be found in Kunststoffhandbuch, Vol. VII, by Vieweg and Hochtlen, Carl-Hanser-Verlag, Munich 1966, on pages 103 to 113 and also in Kunstoffhandbuch, Vol. VII, by Becker and Braun, Carl-Hanser-Verlag, Munich 1983, on pages 92 to 111.

Rigid foams produced with the polyester polyols according to the invention may be used as insulating boards, sandwich elements with various surface layers, as in situ foam, such as sprayed foam, or high-strength foams produced by the overcoating technique, solar collector fillings, tube insulations, as filling and assembly foams and as block foams.

They may be produced by continuous or batch-type processes of the type normally used in the processing of polyurethanes, such as for example in the laminator process, spraying or casting processes, using high-pressure or low-pressure foaming machines.

The invention is further illustrated but is not intended to be limited by the following examples in which all parts and percentages are by weight unless otherwise specified.

EXAMPLES

A. Production of the polyester polyols I

EXAMPLE 1

A polyester polyol was made from 217 g (1.25 moles) of adipic acid dimethylester and 443 g (2.5 moles) of bis-(2-hydroxypropyl)-hydroxyethylmine and 0.1 ml titanium tetrabutyltitanate by transesterification with removal of methanol by distillation (10–15 hours at 130°–157° C.) under nitrogen and subsequent application of vacuum at 100° to 140° C. MR (molar ratio of dicarboxylic acid (derivative) to trialkanolamine)=1:2.0.

Yield: 580 g, quantitative.
OH number: 475.
Acid number: 0.9.
Viscosity: 6630 mPa.s at 25° C.

EXAMPLE 2

A polyester polyol was made from 4800 g (29.7 moles) of bis-(2-hydroxyethyl)-2-hydroxypropylamine and 2560 g (14.7 moles) of adipic acid dimethylester and 0.2 ml titanium tetrabutyltitanate by distilling off methanol under nitrogen and applying vacuum at 100° to 140° C. MR=1:2.02.

Yield: 6400 g, substantially quantitative.
OH number: 488.
Acid number: 1.2.
Viscosity: 4800 mPa.s at 25° C.

EXAMPLE 3

A polyester polyol was made from 194 g (1 mole) phthalic acid dimethylester and 326 g (2 moles) bis-(2-hydroxyethyl)-2-hydroxypropylamine and 0.1 ml tetrabutyltitanate by distilling off methanol under nitrogen at 100° to 140° C. MR=1:2.0

Yield: 450 g, quantitative.
OH number: 480.

Because of its aromatic radicals Z, the polyester polyol did not flow at room temperature and was less preferred.

A free-flowing polyester polyol was obtained when 0.9 mole adipic acid and 0.1 mole phthalic acid were substituted for the mole of one phthalic acid.

EXAMPLE 4

A polyester polyol was made from 174 g (1 mole) succinic acid diethylester and 326 g (2 moles) bis-(2-hydroxyethyl)-2-hydroxypropylamine by distilling off ethanol under nitrogen at 100° to 140° C. and applying vacuum. MR=1:2.

Yield: 430 g, quantitative.
OH number: 500.
Viscosity: 1250 mPa.s at 25° C.

EXAMPLE 5
(Comparison)

A polyester polyol was made from 696 g (4 moles) adipic dimethylester and 1192 g (8 moles) triethanolamine by distilling off methanol under nitrogen at 100° to 150° C. and applying vacuum. MR=1:2.
Yield: 1630 g, pale yellow.
OH number: 547.
Acid number: 1.0.
Viscosity: 3830 mPa.s at 25° C.

EXAMPLE 6

A polyester polyol was made from 396 g (3 moles) malonic acid dimethylester and 978 (6 moles) bis-2-hydroxyethyl)-2-hydroxypropylamine by distilling off methanol under nitrogen at 100° to 180° C. and applying vacuum. MR=1:2.
Yield: 1150 g, quantitative.
OH number: 650.
Viscosity: 3300 mPa.s at 25° C.

EXAMPLE 7

A polyester polyol was made from 288 g (2 moles) maleic acid dimethylester and 708 g (4 moles) bis-(2-hydroxyethyl)-2-hydroxypropylamine by distilling off methanol under nitrogen at 80° to 140° C. and applying vacuum. MR=1:2.
Yield: 870, quantitative.
OH number: 500.
Viscosity: 6300 mPa.s at 25° C.

EXAMPLE 8

A polyester polyol was made from 960 g (6 moles) glutaric acid dimethylester and 1956 g (12 moles) bis-(2-hydroxyethyl)-2-hydroxypropylamine by distilling off methanol under nitrogen at 140° to 160° C. and applying vacuum. MR=1:2.
Yield: 2520 g, quantitative.
OH number: 515.
Viscosity: 5480 mPa.s at 25° C.

EXAMPLE 9

A polyester polyol was made from 7300 g (50 moles) adipic acid and 16300 g (100 moles) bis-(2-hydroxyethyl)-2-hydroxy-propylamine by esterification in the usual way for about 8 hours under nitrogen at 140° to 180° C. by distilling off water and subsequently applying vacuum. MR=1:2.
Yield: 21,800 g, light yellow oil.
OH number: 505.
Viscosity: 6200 mPa.s at 25° C.

EXAMPLE 10

A polyester polyol was made from 10.05 kg (75 moles) technical glutaric acid (50% glutaric acid, 25% adipic acid, 25% succinic acid) and 24.45 kg (150 moles) bis-(2-hydroxyethyl)-2-hydroxypropylamine by distilling off water under nitrogen at 140° to 180° C. and applying vacuum.
Yield: 31.2 kg.
OH number: 467.
Viscosity: 11,750 mPa.s at 25° C.

EXAMPLE 11

An oligo-polyester polyol was made from 292 g (2 moles) adipic acid and 489 g (3 moles) bis-(2-hydroxyethyl)-2-hydroxy-propylamine by distilling off water under nitrogen at 130° to 190° C. and applying vacuum. MR=1:1.5.
Yield: 700 g, quantitative.
OH number: 360.
Viscosity: 19,000 mPa.s at 25° C.

EXAMPLE 12

An oligo-polyester polyol was made from 264 g (2 moles) technical glutaric acid and 489 g (3 moles) bis-(2-hydroxyethyl)-2-hydroxypropylamine by distilling off water under nitrogen at 130° to 180° C. and applying vacuum. MR=1:1.5.
Yield: 680 g, quantitative.
OH number: 341.
Viscosity: 59,000 mPa.s at 25° C.

EXAMPLE 13

An oligo-polyester polyol was made from 145 g (1 mole) adipic acid and 203.8 g (1.25 moles) bis-(2-hydroxyethyl)-2-hydroxy-propylamine by distilling off water under nitrogen at 155° C. and applying vacuum. MR=1:1.25.
Yield: 313 g, quantitative.
OH number: 298.
Viscosity: 90,000 mPa.s at 25° C.

EXAMPLE 14

An oligo-polyester polyol was made from 1.98 kg (15 moles) technical glutaric acid and 2.79 kg (23.25 moles) bis-(2-hydroxyethyl)-2-hydroxypropylamine by distilling off water under nitrogen at 150° to 160° C. and applying vacuum. MR=1:1.55.
Yield: 5.2 g, quantitative.
OH number: 360.
Viscosity: 39,000 mPa.s at 25° C.

EXAMPLE 15

An oligo-polyester polyol was made from 1.98 kg (15 moles) technical glutaric acid and 3.91 kg (24 moles) bis-(2-hydroxyethyl)-2-hydroxypropylamine by distilling off water under nitrogen at 150° to 180° C. and applying vacuum. MR=1:1.6.
Yield: 5.35 kg, quantitative.
OH number: 407.
Viscosity: 18,800 mPa.s at 25° C.

EXAMPLE 16

An oligo-polyester polyol was made from 1.98 kg (15 moles) technical glutaric acid and 4.155 kg (25.5 moles) bis-(2-hydroxyethyl)-2-hydroxypropylamine by distilling off water under nitrogen at 150° to 180° C. and applying vacuum. MR=1:1.7.
Yield: 5.59 kg, quantitative.
OH number: 430.
Viscosity: 13,950 mPa.s at 25° C.

EXAMPLE 17

A polyester polyol was made from 720 g (5 moles) adipic acid, 855 g (5 moles) bis-(2-hydroxypropyl)-hydroxyethylamine and 745 g (5 moles) triethanolamine by distilling off water under nitrogen at 100° to 150° C. and applying vacuum. MR=1:2.0.
Yield: substantially quantitative.
OH number: 484.
Viscosity: 19,000 mPa.s at 25° C.

EXAMPLE 18

A polyester polyol was made from 720 g (5 moles) adipic acid, 815 g (5 moles) bis-(2-hydroxyethyl)-2-hydroxypropylamine and 885 g (5 moles) bis-(2-hydroxypropyl)-hydroxyethylamine by distilling off water under nitrogen at 110° to 160° C. and applying vacuum. MR = 1:2.0.

Yield: substantially quantitative.
OH number: 488.
Viscosity: 8850 Mpas.s at 25° C.

B. Production of rigid foams by the isocyanate polyaddition process

POLYURETHANE OR POLYURETHANE(UREA) RIGID FOAMS

The polyesters and polyethers described below and in Examples 1–18 were manually foamed. The materials and quantities used are indicated in Tables 1–6. The raw materials were first thoroughly mixed with one another and, after addition of the indicated quantity of isocyanate, the resulting mixture was stirred for 10 to 15 seconds and then poured into an open or closable mold.

Free foams measuring 30×30×30 cm and compressed foam panels measuring 30×30×6 cm were formed. Standard test specimens measuring 190×90×10 mm were used for flammability classification in accordance with DIN 4102. In some cases, the test specimens were made longer, although the 190 mm mark was identified in order to fully determine poor burning behavior.

STARTING RAW MATERIALS

The isocyanate used was a commercial polyphenyl polymethylene polyisocyanate (Desmodur® V20, a product of Bayer AG-D-5090 Leverkusen) which had been obtained by phosgenation of an aniline-formaldehyde condensate and which had an NCO content of 31% by weight.

COMPARISON POLYESTER 1

A commercial, slightly trifunctionalized polyester polyol of adipic acid, phthalic acid, glycerol and propylene glycol having an OH number of 210 (Desmophen 2450 X, a product of Bayer AG).

COMPARISON POLYESTER 2

A commercial polyester polyol of adipic acid, phthalic acid and diethylene glycol having an OH number of 200 (Desmophen PEP 53 D, a product of Bayer AG).

COMPARISON POLYESTER 3

A commercial polyester polyol of phthalic acid diethylene glycol and ethylene glycol having an OH number of 290 (Desmophen VP-PU 1431, a product of Bayer AG).

COMPARISON POLYETHER 1

A commercial polyether polyol of ethylenediamine and propylene oxide having an OH number of 470 (Desmophen 4051 B, a product of Bayer AG).

COMPARISON POLYETHER 2

A polyether polyol based on sucrose and propylene oxide having an OH number of 460.

TABLE 1

| Raw Materials | a* | b* | c* | d* | e | f |
|---|---|---|---|---|---|---|
| Comparison polyether 2 | 100 | 20 | 20 | 20 | 20 | 20 |
| Comparison polyester 3 | — | 80 | — | — | — | — |
| Comparison polyester 1 | — | — | 80 | — | — | — |
| Comparison polyester 2 | — | — | — | 80 | — | — |
| Polyester polyol of Example 9 | — | — | — | — | 80 | — |
| Polyester polyol of Example 10 | — | — | — | — | — | 80 |
| Stabilizer AC 3278, a product of Bayer AG | 1.8 | 1.8 | 1.8 | 1.8 | 1.8 | 1.8 |
| Water | 2.1 | 2.1 | 2.1 | 2.1 | 2.1 | 2.1 |
| Activated Desmorapid ® 726 b (Bayer AG) | 3.0 | 1.0 | 1.9 | 0.9 | 0.5 | 0.5 |
| Blowing agent (monofluorotrichloromethane) | 44 | 44 | 44 | 44 | 44 | 44 |
| Quantity of isocyanate | 159 | 123 | 106 | 105 | 166 | 158 |
| Index | 110 | 110 | 110 | 110 | 110 | 110 |
| Cream time (secs.) | 17 | 28 | 19 | 20 | 20 | 21 |
| Gel time (secs.) | 85 | 84 | 80 | 83 | 81 | 82 |
| Surface | tough | tough | tough | tough | tough | tough |
| Hardening after | 4'30" | 10'20" | 11'49" | 13'30" | 5'0" | 6'10" |
| Gross density (kg/m$^3$) | 20 | 19 | 20 | 19 | 21 | 20 |

Hardening was determined by a manual method so that the values can only be interpreted relative to one another.
*Test a–d are comparison tests.

TABLE 2

| Raw materials | a | b | c | d |
|---|---|---|---|---|
| Comparison polyether 2 | 45 | — | — | — |
| Comparison polyether 1 | 54 | — | — | — |
| Comparison polyester 1 | — | 100 | — | — |
| Polyester polyol of Example 7 | — | — | 100 | — |
| Polyester polyol of Example 9 | — | — | — | 100 |
| Flameproofing agent Disflamoll TCA, a product of Bayer AG | 20 | 20 | 20 | 20 |
| Polyurax SR 242 (an emulsifier made by BP) | 1.5 | 1.5 | 1.5 | 1.5 |
| Blowing agent (monofluorotrichloromethane) | 33 | 33 | 33 | 33 |
| Activator Desmorapid ® 726 b (Bayer AG) | — | 0.8 | 0.6 | — |
| Quantity of isocyanate | 122 | 56 | 131 | 131 |
| Index | 110 | 110 | 110 | 110 |
| Cream time (secs.) | 50 | 42 | 43 | 60 |
| Gel time (secs.) | 150 | 151 | 159 | 130 |
| Surface | tough | tough | tough | tough |
| Shrinkage | — | heavy | — | — |
| Gross density kg/m$^3$ | 37 | * | 39 | 38 |
| Hardening after | 5'30" | * | 5'10" | 6'20" |

*Values could not be determined because of excessive shrinkage tendency.

TABLE 3

| Raw materials | Parts by weight in formulation | | | | | | |
|---|---|---|---|---|---|---|---|
| | a | b | c | d | e | f | g |
| Comparison polyester 1 | 65 | — | — | — | — | — | — |
| Comparison polyether 2 | — | 29.3 | — | — | — | — | — |
| Comparison polyether 1 | — | 35.7 | — | — | — | — | — |
| Polyester polyol of Example 6 | — | — | 65 | — | — | — | — |
| Polyester polyol of Example 7 | — | — | — | 65 | — | — | — |
| Polyester polyol of Example 8 | — | — | — | — | 65 | — | — |
| Polyester polyol of Example 9 | — | — | — | — | — | 65 | — |
| Polyester polyol of Example 10 | — | — | — | — | — | — | 65 |
| Desmophen ® 4090 N (Bayer AG) | 15 | 15 | 15 | 15 | 15 | 15 | 25 |
| Disflamoll ® TCA (Bayer AG) | 20 | 20 | 20 | 20 | 20 | 20 | 20 |
| Polyurax SR 242 (an emulsifier made by BP) | 1.5 | 1.5 | 1.5 | 1.5 | 1.5 | 1.5 | 1.5 |
| Desmorapid ® 726 b (Bayer AG) | 1.0 | 0.3 | 0.8 | 0.8 | 0.1 | — | — |
| Blowing agent (monofluorotrichloromethane) | 27.4 | 27.4 | 27.4 | 27.4 | 27.4 | 27.4 | 27.4 |
| Quantity of isocyanate | 55.5 | 100.3 | 131.2 | 105.2 | 109 | 116.5 | 100 |
| Index | 110 | 110 | 110 | 110 | 110 | 110 | 110 |
| Shrinkage | serious | — | — | — | — | — | — |
| Gross density (kg/m³) | cannot be measured | 38 | 40.7 | 36.6 | 38.7 | 35.8 | 37.8 |
| Fire test according to DIN 4102 | | | | | | | |
| Edge flame application (mm) | * | 200 | 127 | 135 | 107 | 103 | 103 |
| Surface flame application (mm) | * | 180 | 122 | 143 | 103 | 103 | 105 |

*not measured; shrinks during preparation

Table 3 shows that the polyester polyols according to the invention are superior to conventional polyether combinations (Example b) in the fire test according to DIN 4102, whereas conventional polyesters alone (Example a) do not give useful rigid foams.

The flame length obtained where the polyester polyols according to the invention are used is well short of the 150 mm mark required for the B2 classification (using flameproofing agent Disflamoll TCA).

Similar results are obtained with the incorporable flameproofing agent Baytherm 4090 as sole flameproofing component, as shown in Table 4.

Table 4 shows clearly the superiority of the polyesters according to the invention.

Table 5 aso clearly shows the superiority of the polyesters according to the invention. Example (c) in Table 5 shows that polyester polyols containing two secondary OH groups are inferior to those containing one secondary OH group per ester group.

Table 6 illustrates the superiority of the polyesters according to the invention in the preferred OH number range.

TABLE 4

| Raw materials | Parts by weight in formulation | | | | | | | |
|---|---|---|---|---|---|---|---|---|
| | a | b | c | d | e | f | g | h |
| Comparison polyester 1 | 80 | — | — | — | — | — | — | — |
| Comparison polyether 2 | — | 36 | — | — | — | — | — | — |
| Comparison polyether 1 | — | 44 | — | — | — | — | — | — |
| Polyester polyol of Example 4 | — | — | 80 | — | — | — | — | — |
| Polyester polyol of Example 6 | — | — | — | 80 | — | — | — | — |
| Polyester polyol of Example 7 | — | — | — | — | 80 | — | — | — |
| Polyester polyol of Example 8 | — | — | — | — | — | 80 | — | — |
| Polyester polyol of Example 9 | — | — | — | — | — | — | 80 | — |
| Polyester polyol of Example 10 | — | — | — | — | — | — | — | 80 |
| Baytherm ® 4090 N (Bayer AG) | 20 | 20 | 20 | 20 | 20 | 20 | 20 | 20 |
| Polyurax SR 242 (an emulsifier made by BP) | 1.0 | 1.0 | 1.0 | 1.0 | 1.0 | 1.0 | 1.0 | 1.0 |
| Desmorapid ® 726 b (Bayer AG) | 1.25 | 0.3 | — | 0.8 | 0.8 | 0.1 | — | — |
| Blowing agent (monofluorotrichloromethane) | 27 | 27 | 27 | 27 | 27 | 27 | 27 | 27 |
| Quantity of isocyanate | 68.8 | 122.5 | 125 | 161 | 129.3 | 134 | 130.4 | 123 |
| Index | 110 | 110 | 110 | 110 | 110 | 110 | 110 | 110 |
| Shrinkage | serious | — | — | — | — | — | — | — |
| Gross density (kg/m³) | — | 38 | 37 | 39 | 39 | 38 | 37 | 38 |
| Fire test according to DIN 4102 | | | | | | | | |
| Edge flame application (mm) | * | >200 | 115 | 143 | 143 | 133 | 128 | 128 |
| Surface flame application (mm) | * | 180 | 97 | 87 | 143 | 130 | 123 | 125 |

*not measured. shrinkage

TABLE 5

| Raw materials | Parts by weight in formulation | | | | | | | | | |
|---|---|---|---|---|---|---|---|---|---|---|
| | a | b | c | d | e | f | g | h | i | j |
| Comparison polyester 1 | 100 | — | — | — | — | — | — | — | — | — |
| Comparison polyether 2 | — | 45 | — | — | — | — | — | — | — | — |
| Comparison polyether 1 | — | 55 | — | — | — | — | — | — | — | — |
| Polyester polyol of Example 1 | — | — | 100 | — | — | — | — | — | — | — |
| Polyester polyol of Example 6 | — | — | — | 100 | — | — | — | — | — | — |
| Polyester polyol of Example 7 | — | — | — | — | 100 | — | — | — | — | — |
| Polyester polyol of Example 8 | — | — | — | — | — | 100 | — | — | — | — |
| Polyester polyol of Example 9 | — | — | — | — | — | — | 100 | — | — | — |

TABLE 5-continued

| Raw materials | Parts by weight in formulation | | | | | | | | | |
|---|---|---|---|---|---|---|---|---|---|---|
| | a | b | c | d | e | f | g | h | i | j |
| Polyester polyol of Example 10 | — | — | — | — | — | — | — | 100 | — | — |
| Polyester polyol of Example 11 | — | — | — | — | — | — | — | — | 100 | — |
| Polyester polyol of Example 12 | — | — | — | — | — | — | — | — | — | 100 |
| Disflamol ® TCA (Bayer AG) | 20 | 20 | 20 | 20 | 20 | 20 | 20 | 20 | 20 | 20 |
| Polyurax SR 242 (BP) | 1.5 | 1.5 | 1.5 | 1.5 | 1.5 | 1.5 | 1.5 | 1.5 | 1.5 | 1.5 |
| Desmorapid ® 726 b (Bayer AG) | 0.8 | — | 2.8 | 0.6 | 0.6 | 0.6 | — | 0.05 | 0.1 | 0.1 |
| Blowing agent (monofluorotrichloromethane) | 32.8 | 32.8 | 32.8 | 32.8 | 32.8 | 32.8 | 32.8 | 32.8 | 32.8 | 32.8 |
| Quantity of isocyanate | 56.3 | 122 | 127.6 | 171.6 | 131.5 | 135.4 | 131.4 | 123.9 | 95.6 | 90.5 |
| Index | 110 | 110 | 110 | 110 | 110 | 110 | 110 | 110 | 110 | 110 |
| Shrinkage | serious | — | — | — | — | — | — | — | — | — |
| Gross density (kg/m$^3$) | — | 37 | 37 | 39 | 39 | 38 | 35 | 37 | 38 | 38 |
| Fire test according to DIN 4102 | | | | | | | | | | |
| Edge flame application (mm) | * | 200 | 175 | 148 | 148 | 135 | 122 | 122 | 123 | 123 |
| Surface flame application (mm) | * | 185 | 115 | 137 | 147 | 125 | 100 | 102 | 100 | 100 |

*not measured, shrinkage

TABLE 6

| Raw materials | Parts by weight in formulation | | | | | |
|---|---|---|---|---|---|---|
| | a | b | c | d | e | f |
| Comparison polyester 1 | 100 | — | — | — | — | — |
| Comparison polyether 2 | — | 45 | — | — | — | — |
| Comparison polyether 1 | — | 55 | — | — | — | — |
| Polyester of Example 9 | — | — | 100 | — | — | — |
| Polyester of Example 10 | — | — | — | 100 | — | — |
| Polyester of Example 11 | — | — | — | — | 100 | — |
| Polyester of Example 12 | — | — | — | — | — | 100 |
| Disflamoll TCA (Bayer AG) | 20 | 20 | 20 | 20 | 20 | 20 |
| H$_2$O | 1.2 | 1.2 | 1.2 | 1.2 | 1.2 | 1.2 |
| Polyurax SR 242 (an emulsifier made by BP) | 1.5 | 1.5 | 1.5 | 1.5 | 1.5 | 1.5 |
| Desmorapid 726 b (Bayer AG) | 0.8 | — | — | 0.06 | 0.1 | — |
| Blowing agent (monofluorotrichloromethane) | 46.6 | 46.6 | 39.2 | 39.2 | 39.2 | 39.2 |
| Quantity of isocyanate | 78.2 | 143.7 | 156 | 147 | 113 | 108 |
| Index | 110 | 110 | 110 | 110 | 110 | 110 |
| Free gross density | — | 28 | 28 | 28 | 28 | 28 |
| Shrinkage | serious | — | — | — | — | — |
| Fire test according to DIN 4102 | | | | | | |
| Edge flame application | * | >200 | 100 | 105 | 114 | 123 |
| Surface flame application | * | 178 | 94 | 95 | 95 | 95 |

To determine their burning behavior, the foams were compressed to 40 kg/m$^3$
*Not measured; shrinkage The Examples with formulations e and f in Table 1 show that the use of the polyester polyols according to the invention leads to a significant improvement in hardening behavior over standard polyester polyols. In practice, therefore, shorter mold-release times are possible.

To enable the hardening times to be better compared, the foams were adjusted to the same gel times. The autocatalytic reaction behavior of the polyester polyols according to the invention is reflected in the greatly reduced quantities of activator (Table 1e-f, 2d, 3e-g, 4f-h, 5d-j, 6c-f).

The burning behavior of these polyester polyols is shown in Tables 3 to 6. It can be seen from these Tables that:

1. Even where relatively large quantities of flameproofing agents are used (Table 3b, 4b, 5b, 6b), the (comparison) polyether polyols used do not produce foams which satisfy the requirements of fire class B2.
2. The use of standard polyester polyols alone, even in combination with flameproofing agent, does not produce foams of the necessary quality (Table 3a, 4a, 5a, 6a).
3. The use of the polyester polyols according to the invention in combination with incorporable and with non-incorporable flameproofing agents leads to high-quality foams which easily satisfy the requirements of fire class B2 according to DIN 4102. The polyester polyols produced with trialkanolamines containing one secondary hydroxy group show considerably better burning behavior than those produced from trialkanolamines containing two secondary hydroxy groups, coupled with high Frigen ® compatibility.

Accordingly, from the point of view of flame resistance and compatibility with blowing agents, the order is as follow:

| Alkanolamine for esterification | Flame resistance | Compatibility with blowing agents |
|---|---|---|
| 1. HO—CH$_2$—CH$_2$—N(CH$_2$—CH$_2$—OH)(CH$_2$—CH$_2$—OH) | * | — |
| 2. HO—CH(CH$_3$)—CH$_2$—N(CH$_2$—CH$_2$—OH)(CH$_2$—CH$_2$—OH) | + | + |

COMPARISON POLYETHER 3

A commercial polyether polyol based on sucrose-propylene oxide having an OH number of 470 (Desmophen ®4034-B, Bayer AG).

TABLE 7

| Raw materials | Parts by weight in formulation | | | | | |
|---|---|---|---|---|---|---|
| | a | b | c | d | e | f |
| Comparison polyether 3 | 60 | 60 | 60 | 60 | 60 | 60 |
| Comparison polyether 4 | 20 | — | — | — | — | 40 |
| Polyester polyol of Example 9 | — | 20 | — | 40 | — | — |
| Polyester polyol of Example 10 | — | — | 20 | — | 40 | — |
| Flameproofing agent (diphenylcresyl phosphate) | 20 | 20 | 20 | 20 | 20 | 20 |
| Stabilizer B 8404 (Goldschmidt) | 1.0 | 1.0 | 1.0 | 1.0 | 1.0 | 1.0 |
| Activator Desmorapid 726 b (Bayer AG) | 0.5 | 0.5 | 0.5 | 0.5 | 0.5 | 0.5 |
| Blowing agent (monofluorotrichloromethane) | 40 | 38 | 38 | 40 | 40 | 40 |
| Quantity of isocyanate | 200 | 200 | 200 | 200 | 200 | 200 |
| 25% potassium acetate in diethylene glycol (catalyst for isocyanurate formation) | 2.0 | 2.0 | 2.0 | 2.0 | 2.0 | 2.0 |
| NCO index | 222 | 220 | 217 | 175 | 172 | 177 |
| Cream time (gel time [secs.]) | 20/58 | 20/58 | 20/56 | 19/54 | 21/56 | 21/53 |
| Gross density (kg/m$^3$) | 38.1 | 39.8 | 39.6 | 40.4 | 41.4 | 40.6 |
| Burning behavior DIN 4102 (classification achieved) | B2 | B2 | B2 | B2 | B2 | B3 |
| Flame height (mm) | 110 | 110 | 120 | 120 | 150 | 110 |
| Depth of penetration (mm): Stamp 3.6 cm φ, p = 1.75 kp/cm$^2$ | | | | | | |
| after 6 mins. | 3.6 | 1.7 | 1.5 | 2.0 | 1.9 | 5.3 |
| after 10 mins. | 3.9 | 2.1 | 1.9 | 2.5 | 2.3 | 6.0 |

*Comparison tests without addition of the polyester polyols according to the invention.

| Alkanolamine for esterification | Compatibility with blowing agents | Flame resistance |
|---|---|---|

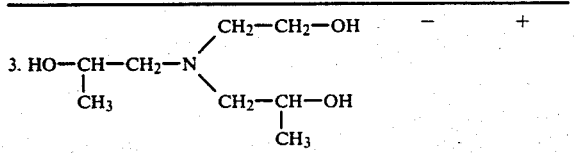

3.

*these esters were not included in the fire tests on account of their poor compatibility with blowing agents (stability in storage of the polyester formulation).

Accordingly, the optimum is obtained where trisalkanolamine 2) is used.

USE OF THE POLYOLS ACCORDING TO THE INVENTION FOR THE PRODUCTION OF POLYISOCYANURATE RIGID FOAMS

The polyethers and polyesters shown in the following Tables 7 and 8 were manually foamed. The raw materials were first thoroughly mixed with one another and, after addition of the indicated quantity of isocyanate, the resulting mixture was stirred for 10 seconds at 4000 r.p.m. and then poured into an open or closable mold.

Burning behavior was tested in accordance with DIN 4102. The depth of penetration as a measure of the hardening of the rigid foam was determined by applying a 3.6 cm diameter stamp to the 20×20×20 cm blocks under a pressure of 1.7 kp/cm$^{-2}$ 6 and 10 minutes after the cream time.

STARTING MATERIALS

The isocyanate used was a commercial polyphenyl polymethylene polyisocyanate which had been obtained by phosgenation of an aniline-formaldehyde condensate and which had an NCO content of 31% by weight (Desmodur 44 V 70, Bayer AG).

COMPARISON POLYESTER 4

A bifunctional polyester polyol of phthalic acid, adipic acid and diethylene glycol having an OH number of 200 (Desmophen PEP 53-D, Bayer AG).

Table 7 shows that the burning behavior of the polyisocyanurate foams improved. This is reflected in the reduced flame heights in Examples (b) to (e).

However, the hardening rate is also clearly improved. The penetration hardness values of the Examples according to the invention are increased by a factor of 2 in relation to the Comparison Examples (a) and (f), i.e. shorter mold-release times and hence greater production levels can be obtained. For example, roof constructions of rigid polyisocyanurate foams are made stronger in this way.

Table 8 below shows that the B2 classification is achieved without flameproofing agents using the polyester polyols according to the invention.

TABLE 8

| Raw materials | Parts by weight in formulation | | | |
|---|---|---|---|---|
| | a | b | c | d |
| Polyester polyol of Example 9 | 100 | — | — | — |
| Polyester polyol of Example 10 | — | 100 | — | — |
| Polyester polyol of Example 14 | — | — | 100 | — |
| Polyester polyol of Example 15 | — | — | — | 100 |
| Flameproofing agent diphenylcresylphosphate | none | none | none | none |
| Stabilizer B 8404 (Goldschmidt) | 1.0 | 1.0 | 1.0 | 1.0 |
| Activator Desmorapid 726 b (Bayer AG) | 0.5 | 0.5 | 0.5 | 0.5 |
| 15% potassium acetate in diethylene glycol | 2.0 | 2.0 | 2.0 | 2.0 |
| Blowing agent monofluorotrichloromethane | 42 | 42 | 37 | 40 |
| Quantity of isocyanate | 230 | 222 | 190 | 295 |
| Index | 200 | 200 | 200 | 200 |
| Gross density (kg/m$^3$) | 41.7 | 39.7 | 44.3 | 39.9 |
| Cream time (gel time [secs.]) | 25/46 | 25/49 | 25/42 | 23/41 |
| Burning behavior DIN 4102 | B2 | B2 | B2 | B2 |
| Flame height (mm) | 100 | 100 | 100 | 100 |

The results of the burning tests clearly show that in every case, foams produced without standard flameproofing agents using the polyester polyols according to the invention fall well short of the mark for B2 classification.

Accordingly, these ester polyols are valuable building blocks for the isocyanate polyaddition process, but especially for the production of polyisocyanurate foams, particularly those which do not contain any additional phosphorus- or halogen-based flameproofing agents. Foams which have a B2 classification with very good flame height values and do not give off any corrosive smoke gases in the event of fire are therefore obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol corresponding to the formula

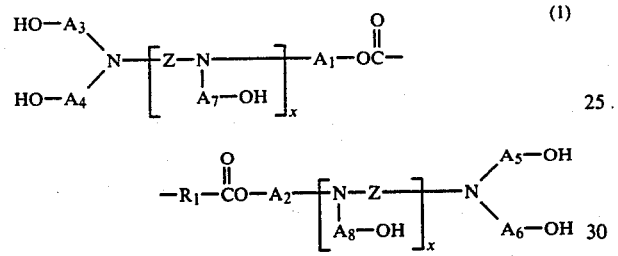

in which
$R_1$ represents a bond or a difunctional radical,
Z represents a difunctional straight chain or branched $C_2-C_6$ alkylene radical,
X represents 0 or 1,
$A_1$, $A_2$, $A_3$, $A_4$, $A_5$, $A_6$, $A_7$, and $A_8$ which may be the same or different, each represents a difunctional straight-chain or branched alkylene radical containing from 2 to 6 carbon atoms
with at least 20% of the radicals $A_3$, $A_4$, $A_5$ and $A_6$ being a secondary CH group and greater than 75% of the radicals $A_1$ and $A_2$ being straight-chain alkylene ester groups
which polyester polyol has an OH number of from 200 to 700 and a viscosity less than 90,000 mPa.s/25° C.

2. The polyester polyol of claim 1 in which $R_1$ represents a straight chain or branched $C_1-C_{12}$ alkylene radical, an unsaturated $C_2-C_{12}$ alkene radical or a $C_6-C_{10}$ arylene radical.

3. The polyester polyol of claim 1 in which $R_1$ represents a straight-chain or branched $C_1-C_{12}$ alkylene radical containing an oxygen, sulfur or —N($C_1-C_4$)-alkyl substituent.

4. The polyester polyol of claim 2 in which $A_1$, $A_2$, $A_3$, $A_4$, $A_5$, $A_6$, $A_7$ and $A_8$ each represents a radical selected from —CH$_2$—CH$_2$—, —(CH$_2$)$_3$—, —(CH$_2$)$_4$,

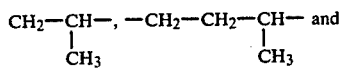

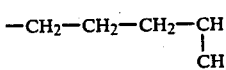

and any secondary —CH— group present is adjacent to a hydroxy group.

5. The polyester polyol of claim 2 in which $A_1$, $A_2$, $A_3$, $A_4$, $A_5$, $A_6$, $A_7$, and $A_8$ each represents a

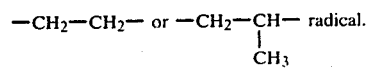

6. The polyester polyol of claim 1 in which $A_1$, $A_2$, $A_3$, $A_4$, $A_5$, $A_6$, $A_7$, and $A_8$ each represents a radical selected from —CH$_2$—CH$_2$—, —(CH$_2$)$_3$—, —(CH$_2$)$_4$—,

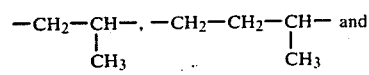

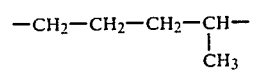

and any secondary —CH— group present is adjacent to a hydroxy group.

7. The polyester polyol of claim 2 in which from 25–75% of the radicals $A_3$, $A_4$, $A_5$ and $A_6$ contain a secondary CH group.

8. The polyester polyol of claim 1 in which from 25–75% of the radicals $A_3$, $A_4$, $A_5$ and $A_6$ contain a secondary CH group.

9. The polyester polyol of claim 1 in which $R_1$ represents a straight-chain $C_2-C_4$ alkylene radical, a branched $C_2-C_4$ alkylene radical or an unsaturated —CH=CH— radical.

10. The polyester polyol of claim 9 in which Z represents an alkylene radical selected from

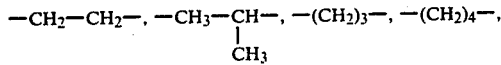

$A_1$, $A_2$, $A_3$, $A_4$, $A_5$, $A_6$, $A_7$, and $A_8$ each represents a

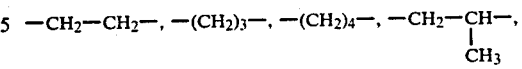

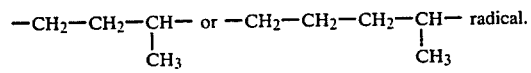

11. The polyester polyol of claim 10 in which $A_1$, $A_2$, $A_3$, $A_4$, $A_5$, $A_6$, $A_7$ and $A_8$ each represents a

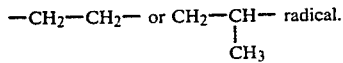

12. The polyester polyol of claim 1 in which Z represents an alkylene radical selected from

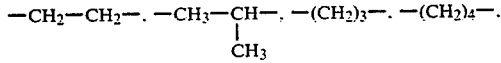

$A_1$, $A_2$, $A_3$, $A_4$, $A_5$, $A_6$, $A_7$ and $A_8$ each represents a

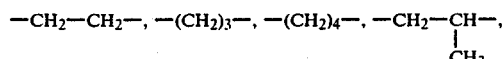

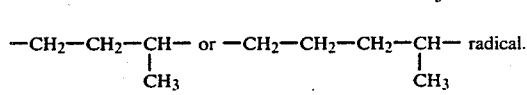

13. The polyester polyol of claim 1 in the form of a mixture or oligomer mixture.

14. The polyester of claim 13 in which more than 75% is represented by one or more of the following formulae

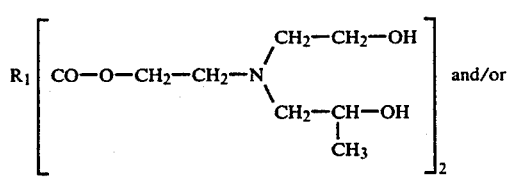 (a) and/or

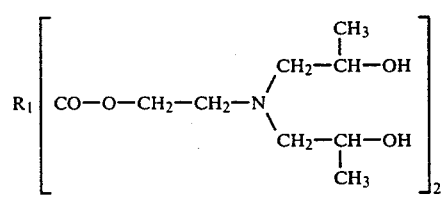 (b)

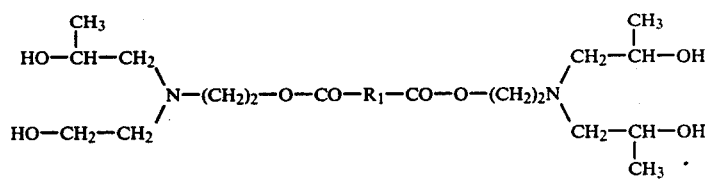 (c)

and/or

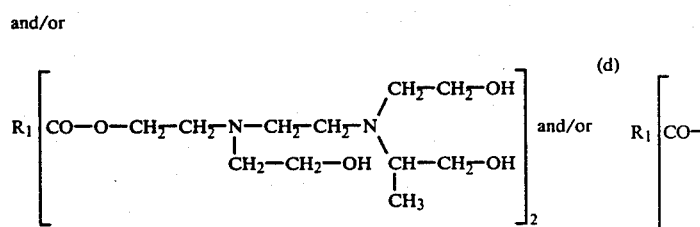 (d) and/or

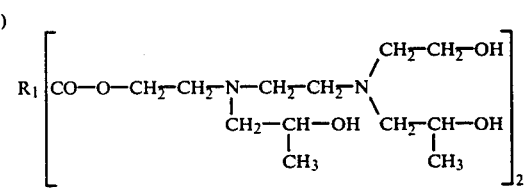 (e)

and/or

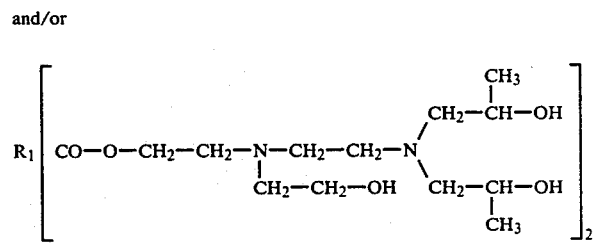 (f)

15. The polyester polyol of claim 14 in which more than 75 wt. % is represented by formula (a) and/or formula (b) and/or formula (c).

16. A process for producing the polyester polyol of claim 1 comprising reacting (a) a dicarboxylic acid corresponding to the formula

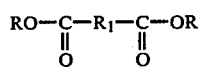

in which R represents hydrogen, an alkyl group or a phenyl group,
$R_1$ represents a bond or a difunctional radical, or a derivative thereof or an anhydride thereof with (b) a tris-alkanolamine corresponding to the formula

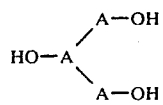

and/or a tetrakis-alkanol diamine corresponding to the formula

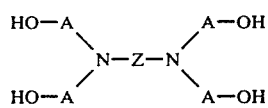

in which
Z represents a difunctional straight chain or branched $C_2$-$C_6$ alkylene radical and
A represents a difunctional straight-chain or branched alkylene radical containing from 2 to 6 carbon atoms
in a molar ratio of (a) to (b) of from 1:1.2 to 1:2.

17. The process of claim 16 in which component (b) is selected from

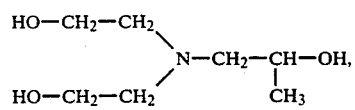

-continued

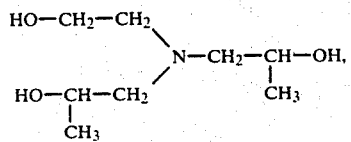

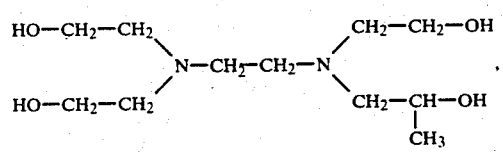

-continued

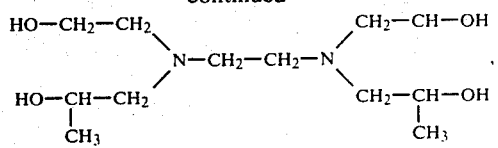

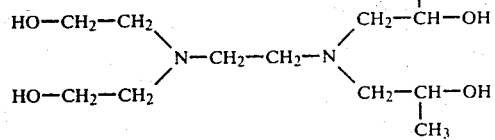

and mixtures thereof.

18. A process for the production of a polyisocyanate addition product comprising reacting the polyester polyol of claim 1 with an isocyanate.

19. A rigid polyisocyanurate foam having a B2 classification which is the reaction product of the polyester polyol of claim 1 with an isocyanate produced without a phosphorus-based or a halogen-based flameproofing agent.

* * * * *